(12) United States Patent
Ikeda et al.

(10) Patent No.: US 8,931,760 B2
(45) Date of Patent: Jan. 13, 2015

(54) BALL VALVE

(71) Applicant: Kabushiki Kaisha Fujikin, Osaka (JP)

(72) Inventors: Shunya Ikeda, Osaka (JP); Izuru Shikata, Osaka (JP)

(73) Assignee: Kabushiki Kaisha Fujikin, Osaka (JP)

( * ) Notice: Subject to any disclaimer, the term of this patent is extended or adjusted under 35 U.S.C. 154(b) by 0 days.

(21) Appl. No.: 14/036,462

(22) Filed: Sep. 25, 2013

(65) Prior Publication Data

US 2014/0084198 A1   Mar. 27, 2014

(30) Foreign Application Priority Data

Sep. 26, 2012 (JP) ................. 2012-213044

(51) Int. Cl.
*F16K 5/06* (2006.01)
(52) U.S. Cl.
CPC ............. *F16K 5/0647* (2013.01); *F16K 5/0636* (2013.01); *F16K 5/0689* (2013.01); *F16K 5/0694* (2013.01)
USPC ....... 251/171; 251/192; 251/214; 251/315.12
(58) Field of Classification Search
USPC ........ 251/170–171, 192, 214, 315.11–315.12
See application file for complete search history.

(56) References Cited

U.S. PATENT DOCUMENTS

| 3,100,501 | A | * | 8/1963 | Hansen et al. | ............. 137/454.6 |
| 3,236,495 | A | * | 2/1966 | Buchholz | ....................... 251/171 |
| 3,675,895 | A | * | 7/1972 | Matousek | ................ 251/315.08 |
| 3,735,956 | A | * | 5/1973 | Matousek | ................ 251/315.05 |
| 4,441,524 | A | * | 4/1984 | Mese | ........................ 137/625.47 |
| 4,685,488 | A | * | 8/1987 | Corbin et al. | .................. 137/328 |
| 5,730,420 | A | * | 3/1998 | Tow | ......................... 251/315.12 |
| 5,857,622 | A | * | 1/1999 | Holt | .............................. 239/124 |
| 5,988,220 | A | * | 11/1999 | Sakaki | ...................... 137/625.47 |
| 6,090,094 | A | * | 7/2000 | Clifford et al. | ............... 604/500 |
| 2006/0060810 | A1 | * | 3/2006 | Timko et al. | ................... 251/314 |

FOREIGN PATENT DOCUMENTS

JP   2011174598   9/2011

* cited by examiner

*Primary Examiner* — John Bastianelli
(74) *Attorney, Agent, or Firm* — The Dobrusin Law Firm, PC

(57) ABSTRACT

The ball valve may be manually opened and closed with ease and securely prevent leakage. The ball valve includes a valve body having a fluid inlet passage, fluid outlet passage, and a communicating part provided between these passages. The ball valve includes a ball having a fluid communication passage and preferably is arranged on the communicating part of the valve body for rotating about a reference axis. A substantially cylindrical ball seat which preferably has a desired opening part on its peripheral wall and is arranged between the ball and valve body. The ball valve includes a ball seat pressing part inside the valve body, adjacent to the ball seat and a presser screw screwed into the inner periphery of the valve body. The presser screw preferably presses the ball seat pressing part by adjustment of its tightening force and presses the ball seat pressing part without contacting the packing.

4 Claims, 3 Drawing Sheets

BALL VALUE

CLAIM OF PRIORITY

The present invention claims the benefit of priority of Japan Patent Application No. 2012-213044 filed Sep. 26, 2012, the contents of which is incorporated by reference in its entirety.

FIELD OF THE INVENTION

The present invention relates to a ball valve. The ball valve preferably may be manually opened and/or closed with ease, such as by reducing handle torque. The ball valve preferably can securely prevent leakage.

BACKGROUND OF THE INVENTION

A conventional ball valve is known to comprise in interior space of its body a structure with a valve disc (ball) opening and closing a flow channel by rotating about a stem shaft and a ball seat arranged so as to surround a periphery of the valve disc. In a ball valve having such structure, it is necessary to press the ball seat to the ball side in order to prevent leakage.

In Japan Patent Tokukai 2011-174598 (patent document 1), as shown in FIG. 4, discloses a ball valve (1') having a structure which sandwiches a ball seat (12') by a ball seat pressing part (14') and a ball seat receiving surface (13') inserted into a cylindrical part of a valve body (2'), and accommodates a ball (3') in the ball seat.

The ball valve (1') in the patent document 1 comprises a fluororesin packing (15') arranged above the ball seat pressing part (14') to seal a gap between a stem (5') and the cylindrical part of the body, and a packing gland (16') arranged above the fluororesin packing, with the ball seat pressing part (14') pressed downward via these by a packing gland screw (17') which was screwed to fit in the inner periphery of the cylindrical part of the body. Therefore, the leakage can be prevented.

If the fluororesin packing (15') is not pressed enough, however, it may absorb displacement due to its elasticity without sufficiently conveying the force to the ball seat pressing part, thereby leading to a leakage. There was a problem that if the packing gland screw (17') is tightened in order to prevent the leakage, the handle would become heavy and opening and closing of the valve by hand would be difficult.

SUMMARY OF THE INVENTION

Problems to be Solved by the Invention

The present invention is made to solve the above-mentioned problems and provides a ball valve which can be manually opened and closed with ease by reducing handle torque and can securely prevent leakage. Means for solving one or more (e.g., all) of the problems are described herein.

One aspect of the invention is directed at a ball valve, comprising a valve body which has a fluid inlet passage, fluid outlet passage, and a communicating part provided between these passages, a ball which has a fluid communication passage and is arranged on a communicating part of said valve body to be able to rotate about a reference axis, a substantially cylindrical ball seat which has a desired opening part on its peripheral wall and is arranged between said ball and said valve body, a ball seat pressing part arranged inside said valve body so as to be adjacent to said ball seat, and a presser screw arranged to be screwed to fit in inner periphery of said valve body. Preferably the ball valve performs communication and interception between the fluid inlet passage and the fluid outlet passage by rotation of the ball about the reference axis. Preferably, the presser screw presses the ball seat pressing part by adjustment of its tightening force and presses the ball seat pressing part without contacting a packing.

Preferably, the presser screw directly presses the ball seat pressing part.

Preferably, the presser screw presses the ball seat pressing part only via a rigid spacer.

According to the various aspects of the invention, since the presser screw directly presses the ball seat pressing part without contacting the packing, the tightening force of the presser screw can be conveyed directly to the ball seat pressing part. Accordingly, even if a tightening torque of the presser screw is low, leakage can be prevented, thereby reducing the handle torque.

According to various preferred aspects of the invention, since the presser screw directly presses the ball seat pressing part, the tightening force of the presser screw can be conveyed directly to the ball seat pressing part. Accordingly, even if a tightening torque of the presser screw is low, leakage can be prevented, thereby reducing the handle torque.

According to various preferred aspects of the invention, since the presser screw presses the ball seat pressing part only via the rigid spacer, the tightening force of the presser screw can be conveyed enough to the ball seat pressing part. Accordingly, even if a tightening torque of the presser screw is low, leakage can be prevented, thereby reducing the handle torque. Moreover, since the ball valve comprises the rigid spacer, a shape of the bottom of the presser screw can be simplified and the presser screw can be easily processed.

DETAILED DESCRIPTION OF THE INVENTION

Hereinafter, the ball valve according to the present invention will be set forth with reference to the drawings. In the following explanation, "upper and lower" and "left and right" mean "upper and lower" and "left and right" in the FIG. 1. These directions are just for convenience, and in an actual installation, an upper and lower direction may not only be a vertical direction, but also be a horizontal direction.

Figure 1:
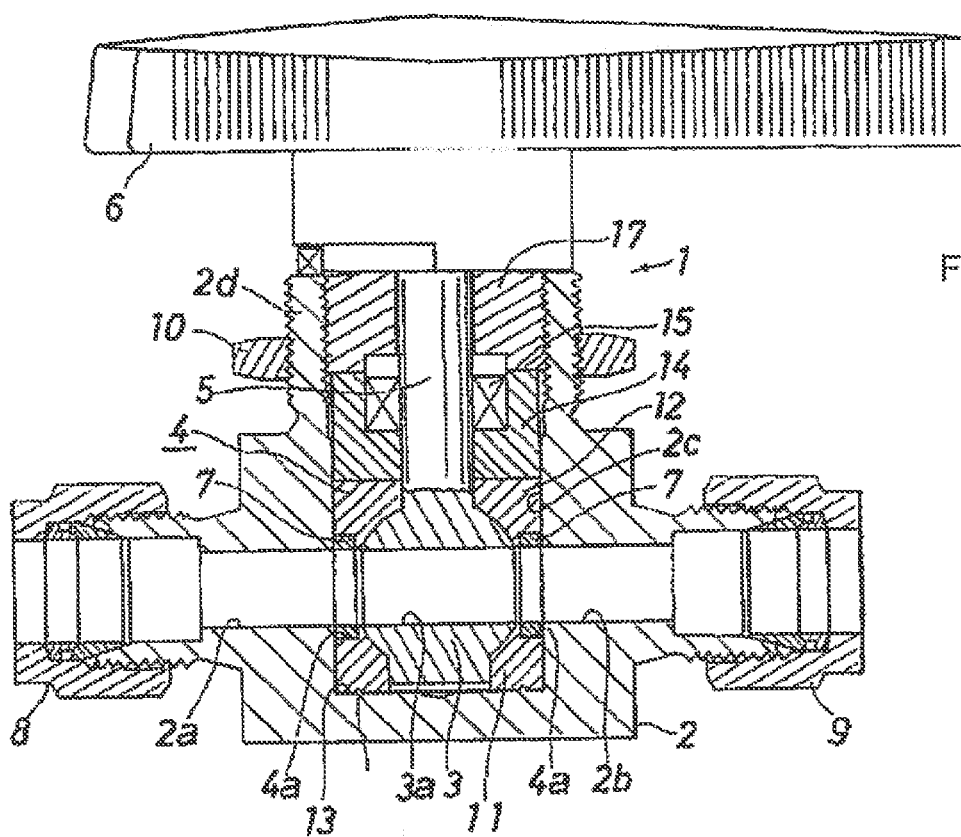
FIG. 1 is a cross sectional front view showing illustrative features of a first embodiment of a ball valve according to the present invention.

FIG. 1 is a cross sectional front view showing a first embodiment of a ball valve (1) according to the present invention. The ball valve (1) preferably is a two-port ball valve and has a valve body (2) which has a fluid inlet passage (2a), fluid outlet passage (2b), and a communicating part (2c) provided between these passages (2a) and (2b), a ball (3) which has a fluid communication passage (3a) and preferably is arranged on the communicating part (2c) of the valve body (2) to be able to rotate about a reference axis (axis in an upper and lower direction), a substantially cylindrical ball seat (4) which has a desired opening part (4a) on its peripheral wall and preferably is closely arranged between the ball (3) and the valve body (2), a stem (5) formed integrally with the ball (3), a handle (6) preferably provided on a top end of the stem (5), and a retainer (7) preferably fitted into the opening part (4a) provided on the ball seat (4).

The valve body (2), the ball (3), the stem (5), and the retainer (7) may be formed from metallic materials such as stainless steel. The ball seat (4) may be formed from synthetic resin materials, and more specifically, it is preferably formed from PTFE (polytetrafluoroethylene), PFA (tetrafluoroethylene perfluoroalkyl vinyl ether copolymer), PEEK (polyetheretherketone), ultrahigh molecular weight polyethylene, etc. Materials of the handle (6) can include, but not limited to, brass castings and nylon 6.

A joint part (8) for connecting an inlet pipe preferably is provided on an inlet part of the fluid inlet passage (2a) of the valve body (2) and a joint part (9) for connecting an outlet pipe is provided on an outlet part of the fluid outlet passage (2b) of the valve body (2). The valve body (2) preferably has a cylindrical part (2d) which projects upward and a panel nut (10) is screwed to fit in a male-screw part provided on the cylindrical part (2d).

FIG. 1 shows a communication between the fluid inlet passage (2a) and the fluid outlet passage (2b) by the fluid communication passage (3a) of the ball (3). Rotating the ball (3) about the reference axis from this communication state and then setting the fluid communication passage (3a) in a direction from the front side to the reverse side of the figure intercepts the communication between the fluid inlet passage (2a) and the fluid outlet passage (2b) (abbreviated in the figure).

Figure 3:
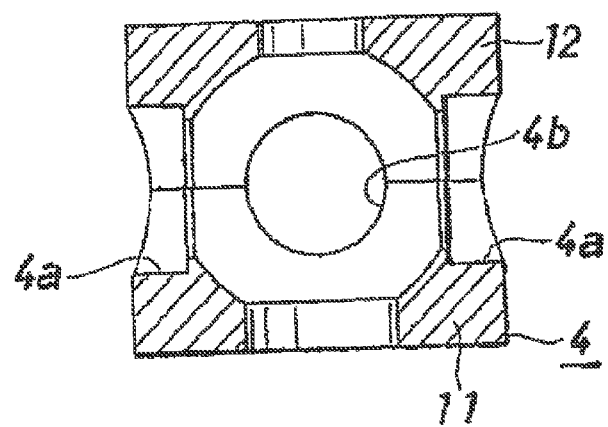
FIG. 3 is an enlarged cross sectional front view showing illustrative features of a ball seat according to the present invention.
Figure 4:
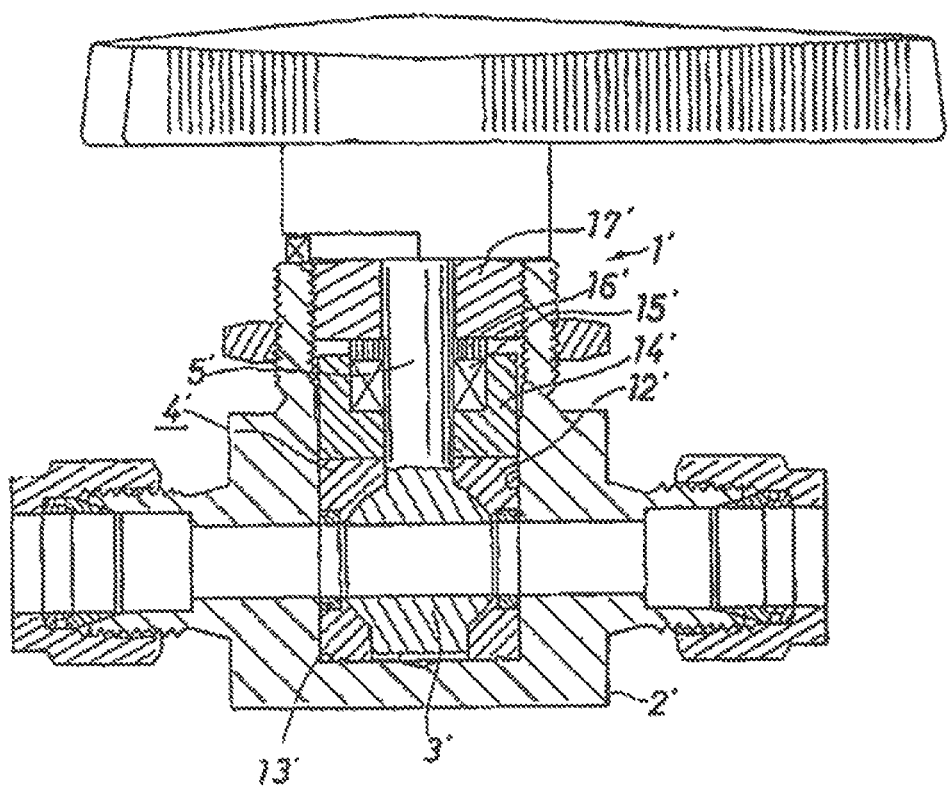
FIG. 4 is a cross sectional front view of a conventional ball valve.

FIG. 3 is an enlarged cross sectional front view showing a ball seat according to the present invention.

As shown in FIG. 3, the ball seat (4) preferably is divided into an upper and lower end. A lower half part (11) and an upper half part (12) formed similar to the lower part (11) faces each other so that the ball (3) is formed in a substantially cylindrical shape to be able to accommodate the ball (3). The bottom surface of the lower half part (11) preferably is received on a ball seat receiving surface (13) which bottom surface constitutes the bottom surface of the fluid communication passage (3a) of the valve body (2) and upper surface of the upper half part (12) is received on the bottom surface of a ball seat pressing part (14).

The ball seat pressing part (14) preferably is formed from metallic materials such as stainless steel and preferably is fitted into the cylindrical part (2d) of the valve body (2). In the upper part of the ball seat pressing part (14), a gland packing (15) preferably made of a fluororesin preferably is held between the stem (5) and the cylindrical part (2d) of the valve body (2).With reference to FIG. 1, the upper part of the ball seat pressing part (14) may have a cut-out towards the stem (5) for accommodating the gland packing (15). The ball seat pressing part (14) preferably is directly pressed downward by a presser screw (17) which was screwed to fit in the inner periphery of the cylindrical part (2d) of the valve body (2) preferably with no gland packing (15) getting involved. Thus, the ball seat (4) preferably is pressed from upwards via the ball seat pressing part (14) by adjustment of the tightening force of the presser screw (17).

Figure 2:
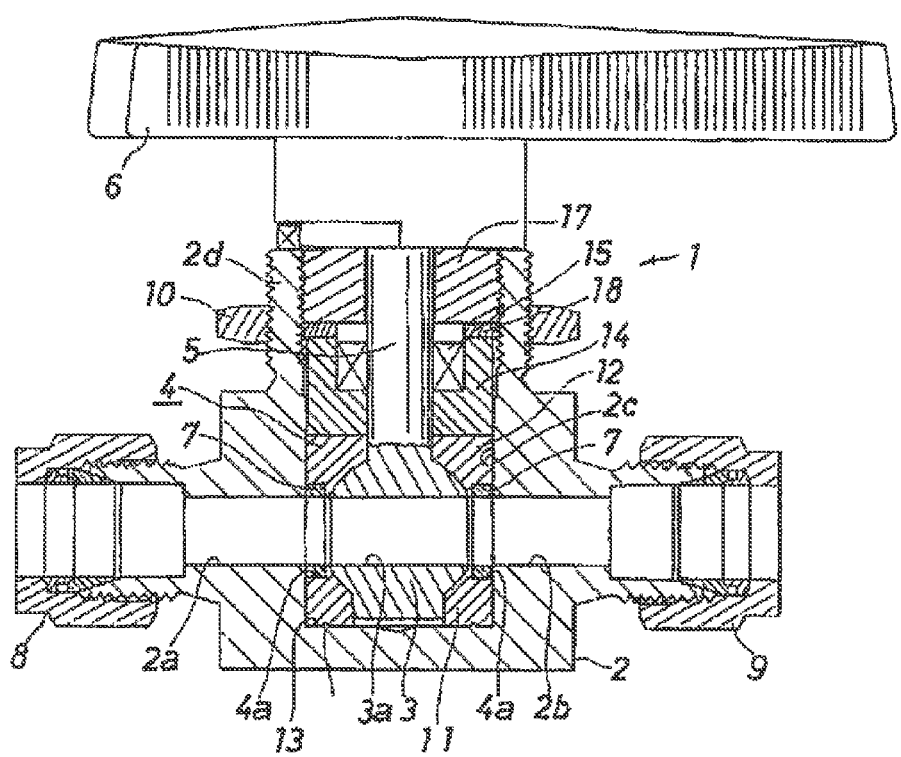
FIG. 2 is a cross sectional front view showing illustrative features of a second embodiment of a ball valve according to the present invention.

FIG. 2 is a cross sectional front view showing a second embodiment of a ball valve according to the present invention. Although, in the first embodiment, the ball seat pressing part (14) is directly pressed downward via the presser screw (17), in the second embodiment, as shown in FIG. 2, a rigid spacer (18) is provided between the presser screw (17) and the ball seat pressing part (14). The rigid spacer (18) preferably does not press the gland packing (15) and preferably presses only the ball seat pressing part (14). Materials of the rigid spacer (18) can preferably include, but not particularly limited to, metallic material such as stainless steel. Since the ball valve comprises the rigid spacer (18), there is an advantage that a shape of the bottom surface of the presser screw (17) can be simplified and easily processed. Moreover, the bottom surface of the ball seat pressing part (14) (that is, a surface in contact with the ball seat (4)) may have a convex or concave shape.

In this way, since the ball seat pressing part (14) is directly pressed by the presser screw (17) preferably with no gland packing (15) getting involved, the gland packing does not absorb displacement resulting from its elasticity unlike the prior art, and the force can always be conveyed sufficiently to the ball seat pressing part. Consequently, leakage may be prevented even if the tightening force of the presser screw (17) is low, and thus the handle torque can be lower, allowing for easy opening and closing of the valve by hand. This configuration ensures the sealing and thus the gland packing (15) may not be provided, but it may be provided to support the stem (5).

The peripheral wall of the ball seat (4) may be provided with a total of four opening parts (4a) and (4b) preferably placed at equal intervals, and the left and right opening parts (4a) shown in FIG. 1 preferably have a substantially circular annular retainer (7) fitted thereinto. With this retainer (7), an opening used as a fluid passage may be secured and deformation of the ball seat (4) may also be controlled. In front and back opening parts (4b) of the ball seat (4) (see FIG. 3), a disk-shaped retainer (abbreviated in the figures) closing these opening parts (4b) preferably is fitted, so that it can be used as a two-port ball valve (1).

EXAMPLES

The ball valve according to the present invention will be further explained in detail based on the following examples, but not limited by these examples.

Three ball valves configured to directly press the ball seat pressing part by the presser screw (example) and three ball valves configured to press the ball seat pressing part via the gland packing (made of a fluororesin, 5 mm in thickness) by the presser screw (comparative example) are prepared. When airproof leakage or leakage between the ball and the ball seat occurs, the gland tightening torque and the handle torque are measured. Results are shown in Table 1.

TABLE 1

| | | Gland Tightening Torque | Handle Torque (N · m) | |
|---|---|---|---|---|
| | No. | (N · m) | Opening→Closing | Closing→Opening |
| Example | No. 1 | 40 | 4.11 | 3.74 |
| | No. 2 | 40 | 4.16 | 3.74 |
| | No. 3 | 40 | 4.17 | 3.96 |
| Comparative Example | No. 1 | 60 | 6.02 | 5.61 |
| | No. 2 | 60 | 7.78 | 7.24 |
| | No. 3 | 60 | 7.25 | 7.24 |

This result reveals that a ball valve configured to directly press the ball seat pressing part by the presser screw (example) without getting the gland packing involved can be sealed with a lower tightening torque compared to a ball valve configured to press the ball seat pressing part via the gland packing (comparative example). Moreover, it reveals that the handle torque can be reduced since the ball valve can be sealed with a low tightening torque. When a handle can be opened and closed by human hand, the torque is said to be 5 N·m or less. The ball valve in the examples can suppress the handle torque less than 5 N·m or less, it therefore shows that the valve can be easily opened and closed by hand.

The present invention has industrial applicability. For example, the present invention may be used as a ball valve for permitting and intercepting flow of fluid.

BRIEF EXPLANATIONS OF REFERENCE NUMERALS IN THE DRAWINGS

1 Ball valve
2 Valve body
2a Fluid inlet passage
2b Fluid outlet passage
2c Communicating part
3 Ball
3a Fluid communication passage
4 Ball seat
4a and 4b Opening part
13 Ball seat receiving surface
14 Ball seat pressing part
15 Gland packing
17 Presser screw
18 Rigid spacer

What is claimed is:

1. A ball valve, comprising:
a valve body which has a fluid inlet passage, a fluid outlet passage, and a communicating part provided between these passages, and a female screw,
a ball which has a fluid communication passage and is arranged on a communicating part of said valve body to be able to rotate about a reference axis,
a substantially cylindrical ball seat having an opening part on its peripheral wall, wherein said cylindrical ball seat is arranged between said ball and said valve body coaxially with said female screw,
a ball seat pressing part arranged inside said valve body so as to be adjacent to said ball seat and having an axial hole in which said stem is inserted,
a ring-shaped packing having a hollow part in which said stem is supported, wherein the ring-shaped packing is fitted in a gap between said ball seat pressing part and an outer peripheral surface of said stem, and
a presser screw arranged to be screwed to fit in said female screw of said valve body,
wherein said ball seat pressing part has a lower portion towards the ball seat and having an upper portion towards the presser screw, the upper portion of the ball seat pressing part includes a cut-out towards the stem, and the cut-out accommodates said ring-shaped packing, and wherein said ball valve performs communication and interception between said fluid inlet passage and said fluid outlet passage by rotation of said ball about said reference axis, and
wherein said presser screw presses said ball seat pressing part by adjustment of its tightening force, and applies a force on said upper portion of said ball seat pressing part as a point other than said cut-out without contacting said ring-shaped packing.

2. The ball valve according to claim 1, wherein said presser screw directly presses said ball seat pressing part.

3. The ball valve according to claim 1, wherein the ball valve includes a rigid spacer, wherein said presser screw presses said ball seat pressing part via the rigid spacer.

4. The ball valve according to claim 3, wherein the rigid spacer directly contacts the presser screw and the ball seat pressing part.

* * * * *